June 27, 1967 P. HOHNSTEIN 3,327,990

IRRIGATION PIPE VALVE

Filed Dec. 7, 1964

INVENTOR.
PAUL HOHNSTEIN

BY Kimmel, Crowell & Weaver
ATTORNEYS.

3,327,990
IRRIGATION PIPE VALVE
Paul Hohnstein, Hastings, Nebr., assignor to Hastings Irrigation Pipe Company, Hastings, Nebr., a corporation of Nebraska
Filed Dec. 7, 1964, Ser. No. 416,545
5 Claims. (Cl. 251—145)

This invention relates to an irrigation pipe valve and has as its primary object the provision of an improved noncorrosive, nonmetallic slidable valve particularly adapted for use with irrigation pipes. An additional object of the invention is the provision of such a valve which consists essentially of only three elements, thus facilitating construction and assembling.

Still another object of the invention is the provision of a valve of this character which incorporates a low profile, thus reducing the possibility of damage during shipping or transport, and which is provided with a relatively flat shoulder facilitating opening and closing from remote position.

A further object of the invention is the provision of a valve of this character which includes a gasket which may be simply and expeditiously removed or replaced when desired, and which includes a gasket guard which holds the leading edge of the gasket snugly in position when the valve is moved to closed position.

A further object of the invention is the provision of a device of this character which includes an arcuate flexible back-up plate, which conforms readily to pipes of this diameter.

A still further object of the invention is the provision of a sleeve or sock adapted to be attached directly to the gate for directing water flowing from the opening when the valve is open, to preclude erosion adjacent the gate.

Still other objects reside in the combinations of elements, arrangements of parts, and features of construction all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
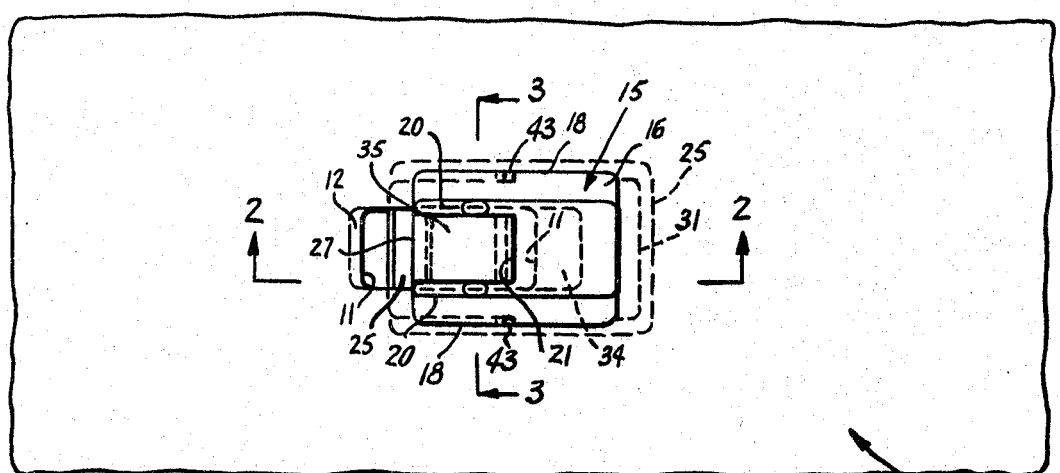
FIGURE 1 is a top plan view of one form of valve embodying the instant inventive concept shown in partially open position, certain concealed elements thereof being indicated in dotted lines.

Having reference now to the drawing in detail, there is generally indicated at 10 a relatively thin walled irrigation pipe having an elongated opening 11 therein, at one end of which is a slightly raised gasket guard or lip 12. The instant invention is generally indicated at 15, and includes a top or back-up plate 16 which is generally rectangular in configuration and which has an arcuate bottom surface 17 provided at its side edges with shoulders 18, which normally enclose the outer surface of pipe 10 on opposite sides of the opening 11. The arrangement is thus such that the back-up or top plate is relatively flexible and may be accommodated to pipes of different diameters. One end of the back-up plate 16 is downwardly inclined as at 19 (see FIGURE 2) and provided with side shoulders 20 forming a guide surface, the purpose of which will be more fully described hereinafter, there being provided a transverse recess 21 at the juncture of inclined surface 19 and the top of the back-up plate.

A sealing gasket preferably comprised of neoprene rubber is generally indicated at 25, and is dimensioned to fit within the pipe, and when the valve is in closed position completely seal the opening 11. A gasket guard generally indicated at 30 includes an integral inner plate 31 which is rectangular in configuration, and of an extent slightly less than that of the gasket, on the upper surface of which is integrally mounted an intermediate plate 32 having an overlying flange 33, gasket 25 having a central opening 26 therein which is snugly enclosed beneath the flange 33 and the adjacent inner plate 31. One end of the intermediate plate 32 is tapered as at 34, to facilitate the sliding of the valve to open position, the tapered portion directly underlying the wall of the pipe 10. At the end of intermediate plate 32 opposite the tapered portion 34 is a vertically upstanding wall or end piece 27 from which an integral top plate 35 extends back over intermediate plate 33. A depending lip 36 at the inner or free end of top plate 35 seats in recess 21, the resiliency of plate 35 serving to hold the gasket, gasket guard and back-up plate securely in related assembly.

Figure 2:
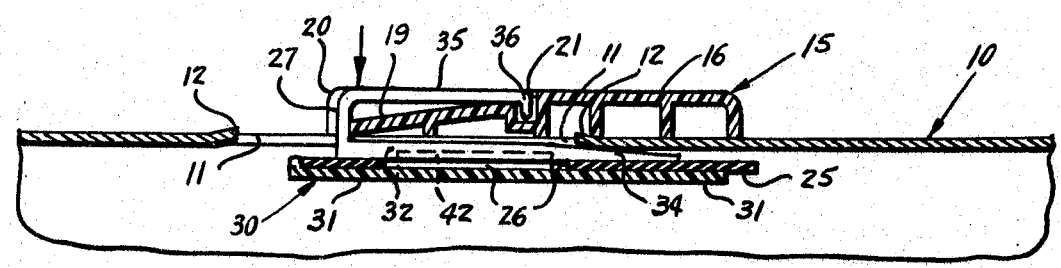
FIGURE 2 is an enlarged sectional view taken substantially along the line 2—2 of FIGURE 1 as viewed in the direction indicated by the arrows.
Figure 3:
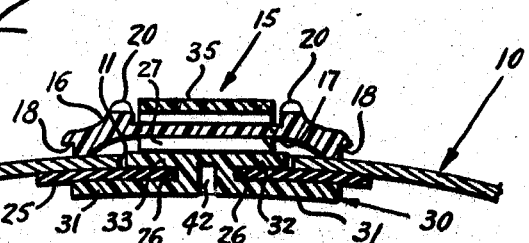
FIGURE 3 is an enlarged sectional view taken substantially along the line 3—3 of FIGURE 1 as viewed in the direction indicated by the arrows.

In the use and operation of the device it will be seen that when the valve is moved to the left as seen in FIGURES 1 and 2, the opening 11 will be completely closed by the gasket 25, and snugly held against the underside thereof by the resiliency of plate 35. When the gate is moved to open position the incline 34 will freeze plate 35 and move gasket 25 and its associated inner plate 31 away from the inside of the pipe wall permitting smooth and facile operation thereof.

Figure 4:
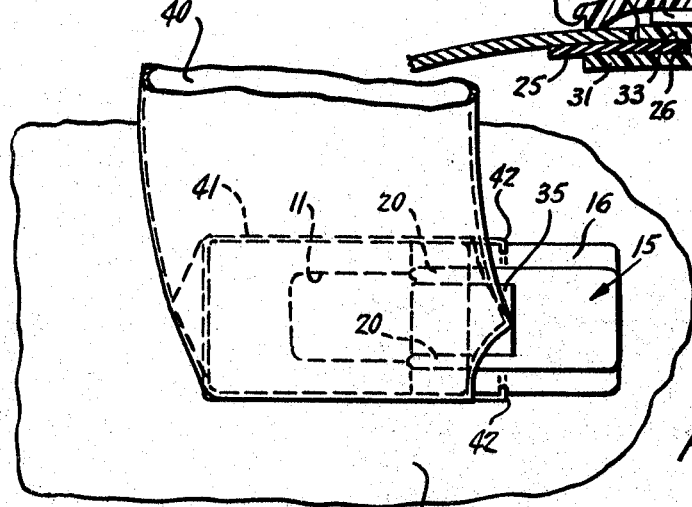
FIGURE 4 is a top plan view similar to FIGURE 1 but showing a water directing sock or sleeve attached to the valve.

In order to direct the flow of water from the opening 11 when the valve is open an elongated plastic flexible sleeve or sock 40 is provided, the end thereof being substantially rectangular in cross-section and double walled to accommodate a U-shaped wire clip 41, the ends of the legs of which are reverted as at 42 (see FIGURE 4) and engage the bores 43 formed in the sides of the shoulders 18 of back-up plate 16. The arrangement is thus such that when the valve is moved to full open position as shown in FIGURE 4, water from the opening 11 flows through sleeve 40 and is directed to any desired locale, thus avoiding any possibility of erosion. A central longitudinal slot 42 is provided in inner plate 31 to provide limited flexibility thereof in accommodating the gasket to the interior or diverse sizes of pipe.

From the foregoing it will now be seen that there is herein provided an improved irrigation pipe valve which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In combination with an irrigation pipe having an opening therein, an irrigation pipe valve comprising, in combination, a slidable flexible back-up plate fitting over said opening, said back-up plate having an arcuate underside linearly movable on said pipe, said back-up plate having a transverse recess across the top thereof, a resilient gasket seating in the irrigation pipe below the opening therein and a gasket guard having a portion underlying said gasket in said pipe and a connected portion overlying said top plate, said last mentioned portion having a dependent lip engaging in said transverse recess, connecting said gasket guard and said gasket to said top plate for linear movement therewith, said gasket guard being comprised of flexible plastic and including a rectangular inner plate of extent slightly less than that of said gasket, an intermediate plate on said inner plate of a width less than said opening in an irrigation pipe and of a height substantially equal to the thickness of the wall of said pipe extending into said opening, said gasket having an opening therein conforming in size to said intermediate plate and engagng snugly therearound, a vertical wall at one end of said intermediate plate and a resilient outer plate integral with said wall and extending over a portion of said intermediate plate, said depending lip being integral with and depending from the free end of said outer plate.

2. The structure of claim 1 wherein said intermediate plate tapers downwardly at the end opposite said wall to facilitate sliding of said gasket to open position.

3. The structure of claim 2 wherein said top has an inclined surface extending from the end thereof to said transverse recess to facilitate engagement of said lip therein.

4. The structure of claim 3 wherein a flexible plastic guide sleeve is connected to said gate to direct fluid flowing from said opening when said valve is open.

5. The structure of claim 4 wherein the sides of said top plate are provided with bores, and one end of said sleeve carries a U-shaped wire clip having inturned ends engageable in said bores to secure said sleeve to said valve.

References Cited

UNITED STATES PATENTS

| | | | |
|---|---|---|---|
| 2,647,539 | 8/1953 | Stearns | 251—145 |
| 2,734,713 | 2/1956 | Webster | 251—145 |
| 2,918,251 | 12/1959 | Epp | 251—145 |
| 2,932,484 | 4/1960 | Stearns | 251—145 |
| 2,975,796 | 3/1961 | Tallman | 251—145 |

M. CARY NELSON, *Primary Examiner.*

WILLIAM CLINE, *Assistant Examiner.*